United States Patent
Sung

(10) Patent No.: US 7,130,363 B2
(45) Date of Patent: Oct. 31, 2006

(54) APPARATUS FOR ESTIMATING PHASE INFORMATION USING MATCHED FILTER IN COMMUNICATION SYSTEM AND METHOD THEREOF

(75) Inventor: Sang Hun Sung, Seoul (KR)

(73) Assignee: LG-Nortel Co., Ltd, Seoul (KR)

( * ) Notice: Subject to any disclaimer, the term of this patent is extended or adjusted under 35 U.S.C. 154(b) by 705 days.

(21) Appl. No.: 10/000,346

(22) Filed: Dec. 4, 2001

(65) Prior Publication Data
US 2002/0067783 A1 Jun. 6, 2002

(30) Foreign Application Priority Data
Dec. 4, 2000 (KR) .......................... 2000-0072947

(51) Int. Cl.
*H03D 1/00* (2006.01)
*H03L 27/06* (2006.01)
(52) U.S. Cl. ...................... 375/343; 375/342; 375/341; 375/147; 370/503
(58) Field of Classification Search ................ 375/343, 375/327, 316, 340, 147, 149, 152, 143, 341, 375/342, 354, 362, 344, 365, 368, 150; 370/503–514
See application file for complete search history.

(56) References Cited

U.S. PATENT DOCUMENTS 5,151,925 A * 9/1992 Gelin et al. .................. 375/328
5,376,894 A * 12/1994 Petranovich ................. 329/306
5,414,729 A * 5/1995 Fenton ........................ 375/149
5,963,586 A * 10/1999 Durrant et al. .............. 375/142
6,049,535 A * 4/2000 Ozukturk et al. ........... 370/335
6,456,827 B1 * 9/2002 Kubo et al. .................... 455/68
6,836,515 B1 * 12/2004 Kay et al. .................... 375/260
2002/0122505 A1 * 9/2002 Avidor et al. ................ 375/329

FOREIGN PATENT DOCUMENTS

KR 2000-027043 A 5/2000

OTHER PUBLICATIONS

Non-English Korean Examination Report.

* cited by examiner

*Primary Examiner*—Mohammed Ghayour
*Assistant Examiner*—Qutub Ghulamali
(74) *Attorney, Agent, or Firm*—Fleshner & Kim, LLP

(57) ABSTRACT

An apparatus and method for estimating phase information, including a matched filter that outputs converted synchronization signals, based on received data, and converted information of the received data; a phase estimator, having a plurality of averagers, that outputs the phase information based on the received data, a code generated from a code generator, and the converted synchronization signals outputted from the matched filter; and a CPU that inputs the converted synchronization signals outputted from the matched filter into the plurality of averagers and initializes the averagers.

20 Claims, 3 Drawing Sheets

APPARATUS FOR ESTIMATING PHASE INFORMATION USING MATCHED FILTER IN COMMUNICATION SYSTEM AND METHOD THEREOF

BACKGROUND OF THE INVENTION

1. Field of the Invention

The present invention relates to a communication system and, more particularly, to an apparatus for estimating phase information using a matched filter in a communication system.

2. Background of the Related Art

Generally, communication systems exchange system information with one another prior to sending/receiving payload data. A signal exchanged by the communication system is referred to as a pilot signal. FIG. 1 illustrates a related art pilot signal having a preamble for synchronization acquisition and a preamble for phase extraction (estimation).

FIG. 2 is a block diagram of a phase estimator using a matched filter according to the related art. The phase estimator includes a matched filter 110 that outputs synchronization signals using received data (I/Q) and converted information. A phase estimator 130, having averagers 137 and 138, outputs phase information using the received data and code information generated from a code generator. A CPU 120 initializes the averagers.

The matched filter 110 only serves to estimate synchronization. The meaning of estimating the synchronization is to generate an accurate point of time (e.g., locked position) of received data and information (e.g., locked energy). The synchronization estimate is used to identify a value with the largest correlation value, which is obtained by a multiplier and an adder in the matched filter 110.

The code generator (not shown) generates a code (PN_I (Inphase PN Code), PN_Q (Quadrature PN Code)) according to a synchronization time estimated by the matched filter 110.

Each of multipliers 131 through 134 multiplies received I and Q data by the respective synchronized code (PN_I, PN_Q) and each of adders 135 and 136 adds its individual code and the received data.

The averagers (MA: moving averages) 137 and 138 obtain and output an average value of the output signals from adders 135 and 136 for a predetermined time. Each average value output is used as phase information (Cos θ, Sin θ).

In such a phase estimator 130, averagers 137 and 138 are used to obtain more accurate phase information. The CPU 120 clears the initial values of the averagers 137 and 138, after estimating the synchronization with the matched filter, so that the averagers 137 and 138 cannot be affected by inaccurate data prior to estimating synchronization. That is, after clearing the initial values of the averagers to "0," with the CPU 120, the output values of adders 135 and 136 are averaged for a predetermined time and used as the phase information.

However, in the related art, it takes a considerable time for the averagers to obtain an accurate phase value. Especially in the case of transmitting packet data, it is necessary to estimate synchronization as soon as possible and to modulate data by obtaining an accurate phase value.

However, the preamble is continuously transmitted in the related art. This is because it is possible to output complete phase information only by receiving a predetermined sequence of bits at the averagers 137 and 138. The predetermined sequence of bits takes precedence over the transmission of data. Thus, the performance of the transmission is degraded.

As illustrated in FIG. 1, a preamble for synchronization acquisition, a preamble for phase extraction, and data are transmitted in the case of transmitting the packet data. The preamble for phase extraction of predetermined bits must be transmitted regardless of the preamble for synchronization acquisition. In other words, the preamble for phase extraction is transmitted even after transmitting the preamble for synchronization acquisition, thereby reducing the transmission rate of the full data in the related method.

SUMMARY OF THE INVENTION

An object of the invention is to solve at least the above problems and/or disadvantages and to provide at least the advantages described hereinafter.

It is another object of the present invention to provide an apparatus and method for estimating phase information using a matched filter that is capable of obtaining phase information more quickly, by improving related phase information estimation techniques.

It is a further object of the present invention to provide an apparatus and method for estimating phase information using a matched filter that is capable of greatly improving the overall transmission rate.

It is a further object of the invention to transmit a preamble for phase extraction that is shorter than that of the related art using a converted phase value (Cos A, Sin A) of a pilot signal, outputted from the matched filter, for the purpose of phase information estimation.

To achieve the above objects, there is provided an apparatus for estimating phase information using a matched filter. The apparatus includes a matched filter for outputting converted synchronization signals, using received signals, and converted information of the received data; a phase estimator, having a plurality of averagers, for outputting the phase information using the received data, a code generated from a code generator, and information outputted from the matched filter; and a CPU for inputting the information outputted from the matched filter into the averagers and controlling the averagers to be initialized.

In addition, there is provided a method for estimating phase information using a matched filter according to the present invention. The method includes estimating synchronization and outputting data, using received data by a matched filter; initializing or setting an averager; outputting a combination of the received data and a code generated from a code generator; and outputting an average value of the data outputted from the matched filter and the combination data.

The objects of the invention may be further achieved in whole or in part by a method of estimating phase information, including generating a synchronization signal and a converted phase value with a matched filter based on received data, establishing an averaging period based on the synchronization signal, and averaging the converted phase value with combined data during the averaging period to create the phase information for the averaging period.

The objects of the invention may be further achieved in whole or in part by an apparatus for estimating phase information including a matched filter that generates a synchronization signal and a converted phase value based on received data, a processor that establishes an averaging period based on the synchronization signal, and an averaging means for averaging the converted phase value with combined data during the averaging period to create the phase information for the averaging period.

According to the present invention, phase information can be obtained rapidly using the converted phase value of the pilot signal outputted from the matched filter as an initial value of the averagers.

In addition, the method for estimating phase information according to the present invention can reduce a size of a preamble, used for extracting phase information, prior to transmitting actual data, since it can obtain phase information more quickly as compared to the related art.

Accordingly, the performance of a communication system for processing packet data at a high speed and the overall transmission rate can be greatly improved.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In the related method, the phase information is extracted after synchronizing. In the present invention, the synchronization is matched using received data (I/Q) in a matched filter and a value of Cos A and Sin A. A converted phase value of a pilot signal, outputted from the matched filter, is used for extracting phase information. Thus, it is possible to reduce the length of the pilot signal to be transmitted for outputting an average value of a predetermined size.

Figure 1:
FIG. 1 illustrates the structure of a preamble and data according to the related art.
Figure 3:
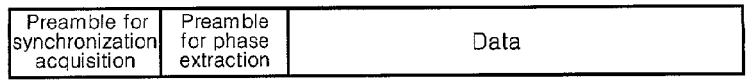
FIG. 3 illustrates the structure of a preamble and data according to the present invention.

FIG. 3 illustrates a size of a preamble for phase extraction transmitted from a sender to a receiver in a case of using the values of Cos A and Sin A, which represent a converted phase value of a pilot signal outputted from the matched filter, to estimate phase information. There is no need to transmit every information for extracting phase information as FIG. 1, since information outputted from the matched filter is used for extracting phase information. Thus, the transmitted preamble becomes smaller as a result like FIG. 3.

Figure 4:
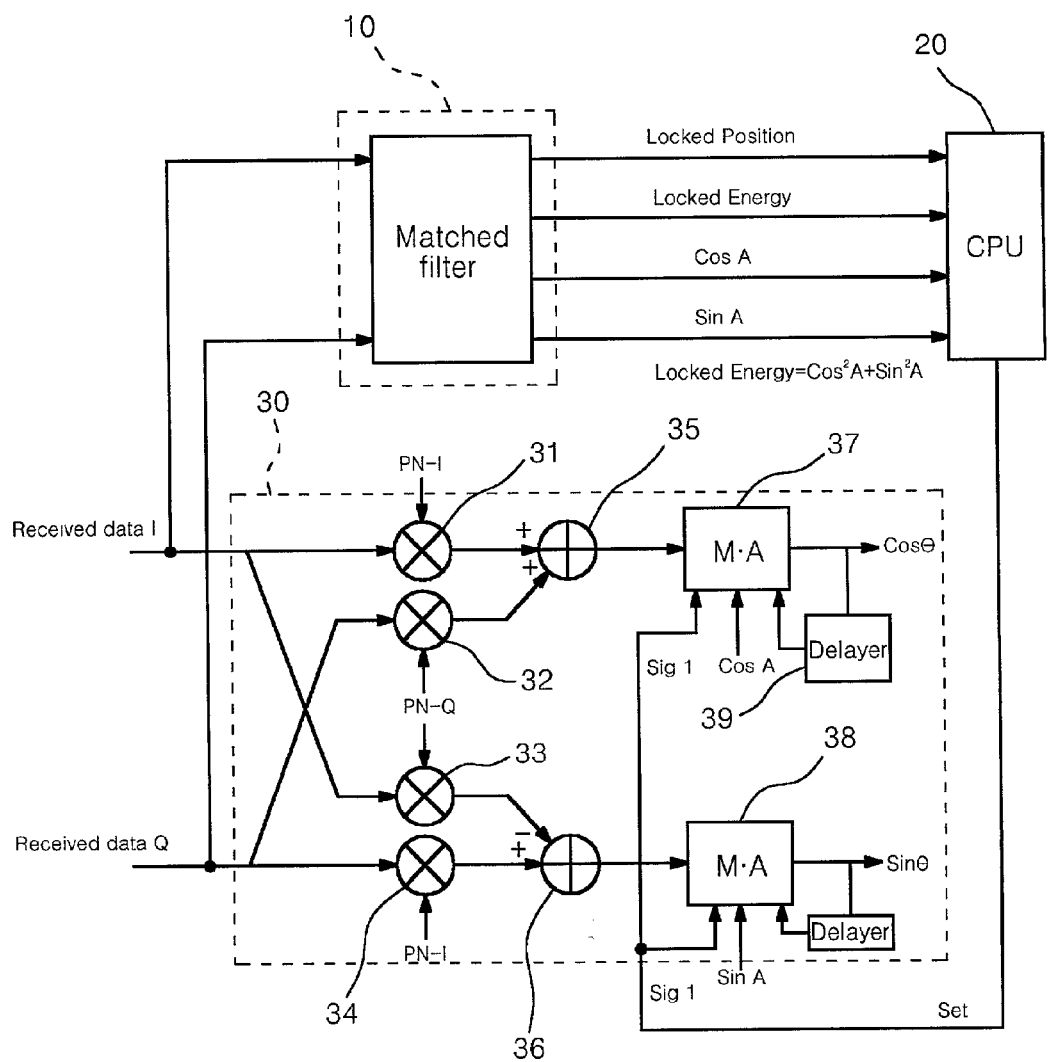
FIG. 4 illustrates a block diagram of a phase estimator using a matched filter, according to the present invention.

FIG. 4 is a block diagram of a phase estimator using a matched filter according to the present invention. A matched filter 10 outputs time information (Locked Position), a correlation value (Locked Energy) for synchronization of input data (I, Q), and a converted phase value (Cos A, Sin A) of a pilot signal; multipliers 31 through 34 multiply the received data and a code generated from a code generator; adders 35 and 36 add the data outputted from the multipliers; a phase estimator 30, having two averagers 37 and 38, obtains an average value of the data outputted from the adders and the matched filter; a delayer 39, connected to the averagers, sends a feedback of the phase information outputted from the averagers to the averagers when generating new phase information; and a CPU 20 inputs the converted phase value (Cos A, Sin A) of the pilot signal, outputted from the matched filter, into the averagers and initializes the averagers.

In the averagers 37 and 38, an initial value which is not a clear logic value is set. In other words, an initial value of the averagers is cleared to "0" in the related art, while the converted phase value of the pilot signal, outputted from the matched filter, is inputted as an initial value of the averagers in the present invention.

The matched filter 10 estimates the synchronization and simultaneously informs the CPU 20 of the converted phase value (Cos A, Sin A) of the pilot signal, which is used as the basis of the estimation of time information and synchronization. The converted phase value of the pilot signal is an integral number expressed in multiple bits. The phase of two values represents a phase shift in a received signal.

The code generator (not shown) generates codes corresponding with the synchronization time estimated by the matched filter 10. The first multiplier 31 multiplies input data (I) by the first code (PN_I) that is synchronized. The second multiplier 32 multiplies input data (Q) by the second code (PN_Q) that is synchronized. The third multiplier multiplies input data (I) by the second code (PN_Q) that is synchronized. The fourth multipliers 34 multiplies input data (Q) by the first code (PN_I) that is synchronized.

Continuously, the first adder 35 adds output signals of the first and second multipliers 31 and 32 and the second adder 36 adds output signals of the third and fourth multipliers 33 and 34.

The codes are integer numbers of multiple bits and the size thereof indicates the value and phase of the signal.

At this time, the signal Sig 1 for setting the averagers, by the CPU 20, is applied to an input end of the averagers 37 and 38.

Thereafter, the output signals of adders 35 and 36 and the converted phase value of the pilot signal outputted from the matched filter 10, under the control of the CPU 20, are inputted to the averagers 37 and 38, respectively, thereby outputting/using the information obtained by applying an average value for a predetermined time as the phase information.

In addition, the output (phase information) of each averager is used for obtaining an average value with respect to the next output value of the adder. As illustrated in FIG. 4, to use the phase information outputted from the averagers for generating new phase information from the averagers, the outputs of the averagers are provided to the averagers by delayers 39.

After delaying the outputs of the averagers for a predetermined time in the delayers 39, the outputs are inputted into the averagers and are used for extracting new phase information. And the delayer can be inside M.A(37,38).

Since the basic structure of the matched filter 10 is identical to the structure of the correlator used in the phase estimator 30, previous phase information can be used for extracting the new phase information in a same manner as Cos A and Sin A outputted from the matched filter was used for extracting the first phase information.

Figure 5:
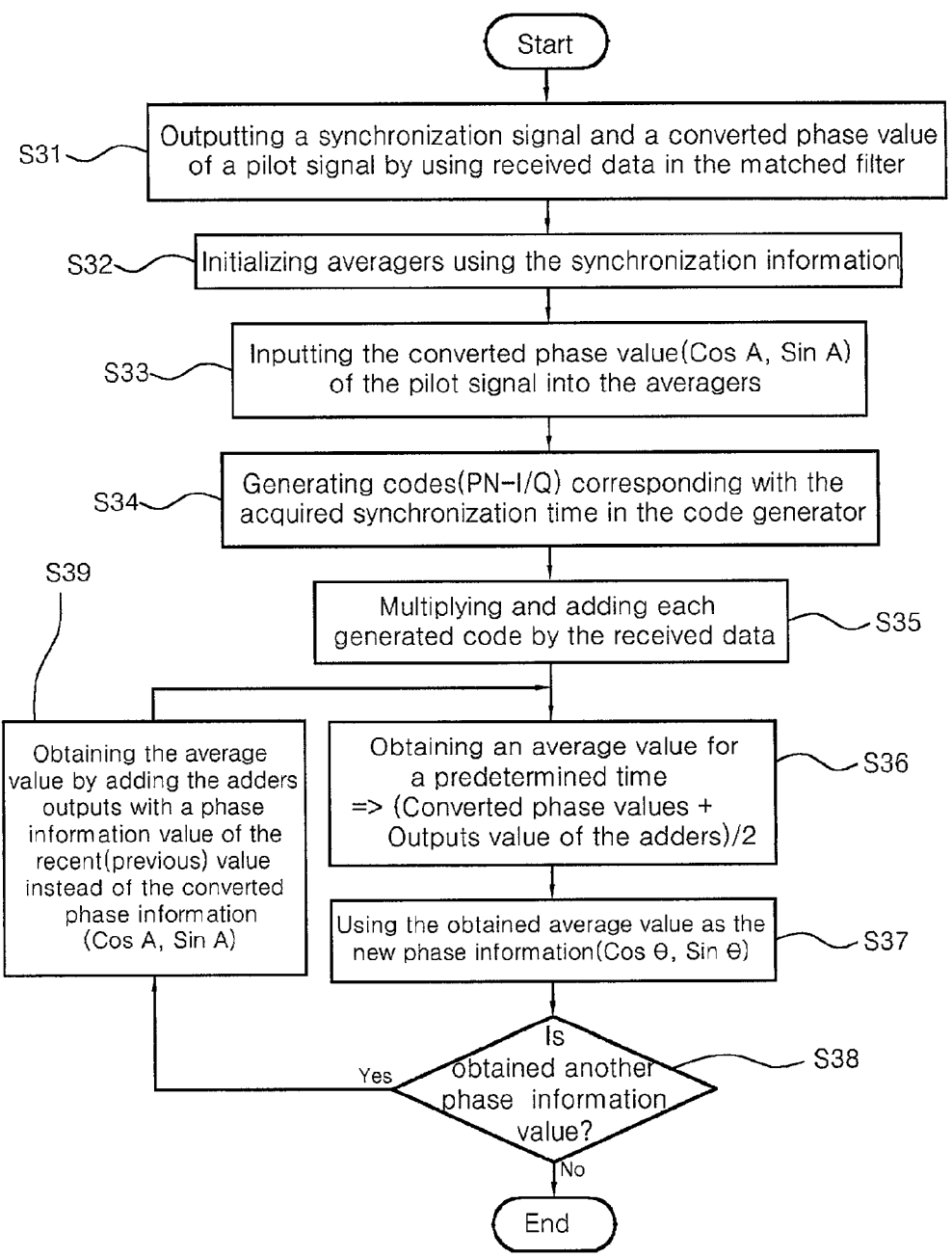
FIG. 5 illustrates a method for estimating phase information, according to the present invention.

FIG. 5 is a flow chart illustrating a method for estimating phase information according to the present invention. The matched filter 10 acquires a synchronization (Locked Position representing a time point of actually receiving a signal and Locked Energy representing a size of a correlation value) and outputs a converted phase value of a pilot signal using the received data (I, Q) (S31).

Figure 2:
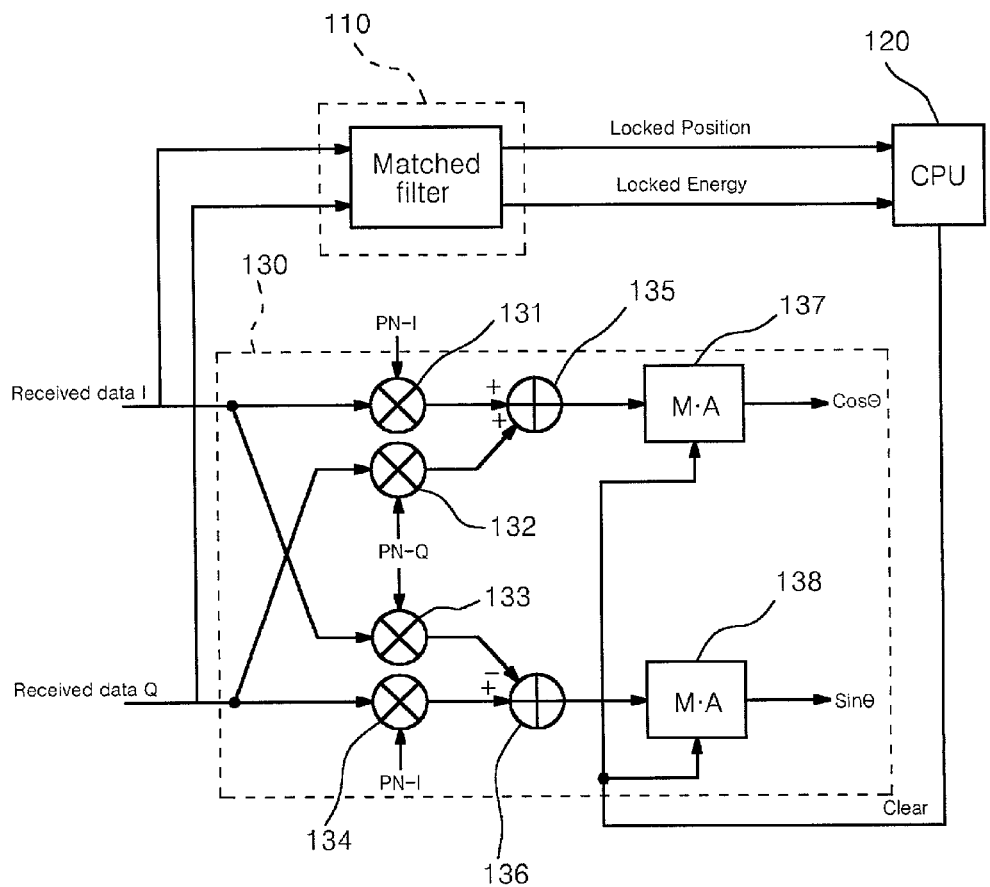
FIG. 2 illustrates a block diagram of a phase estimator using a matched filter, according to the related art.

Initialization is performed by inputting the synchronization information into the averagers 37 and 38 under the control of the CPU 20 (S32). That is, the operation is the same as clearing the averagers 37 and 38 in FIG. 2 of the related art. Thereafter, the converted phase value (Cos A, Sin A) of the pilot signal is inputted into the averagers under the control of the CPU 20 (S33).

Meanwhile, the code generator (not shown) generates codes (PN-I/Q) corresponding with the acquired synchronization time (S34). The received data (I/Q) and the generated codes (PN-I/Q) are outputted to the averagers through multipliers 31 through 34 and adders 35 and 36 (S35).

The data outputted from the adders and the data (Cos A, Sin A) outputted from the matched filter 10 are inputted into the averagers (e.g., Moving Averages) 37 and 38, thereby obtaining an average value for a predetermined time (S36). The obtained average value is used as the phase information. Additionally, the output of the averagers is used to obtain a next average value with respect to the output value of the adder, through the delayer 39. That is, the value inputted to the averagers currently is averaged with phase information of the recently (previous) averaged value obtained through feedback to the averagers through the delayer 39. Then, the currently averaged value is outputted as the new phase information (Cos θ, Sin θ). Thereafter, the cycle repeats with the newly outputted phase information used to obtain a next average value with respect to the subsequent output values of the adders in Steps S37, S38, and S39.

Accordingly, the delay generated in outputting the phase information opportunely is used to estimate subsequent phase information. Because the subsequent phase information uses the information outputted from the matched filter or the phase information outputted from the averagers, the preamble information for phase extraction is decreased as illustrated in FIG. 3. Thereby, the data transmission rate is increased. The first phase information is extracted by inputting the converted phase value of the pilot signal outputted from the matched filter into the averagers. Then, the phase information is obtained by repeatedly averaging the previously (for example, firstly) generated phase information provided by delayers 39 with subsequently received phase information provided by adders 35 and 36.

The present invention can be adapted to a communication system of CDMA using a coherent demodulator, a Wide CDMA (WCDMA) Wireless Local Loop (WLL) system, an IMT-2000 system, and a communication system of CDMA supporting wireless packet data.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for estimating phase information, comprising:
    a matched filter that outputs converted synchronization signals, based on received data, and converted information of the received data;
    a CPU that receives the converted synchronization signals and the converted information to provide a first output signal based on the converted synchronization signals and the converted information outputted from the matched filter; and
    a phase estimator that generates first and second decoded data based on the received data, the estimator having an averager that receives the first output signal from the CPU, the first and second decoded data and the converted information to generate the phase information,
    wherein the converted information comprises converted phase values (cosine A and sine A) of a received pilot signal.

2. The apparatus of claim 1,
    wherein the averager comprises a first averager and a second averager and the phase information comprises a first phase information and a second phase information, the phase estimator further comprising:
    a first delayer receiving the first phase information and outputting a delayed phase information to the first averager, wherein
    the first averager generates subsequent first phase information based on the delayed phase information and the first decoded data;
    a second delayer receiving the second phase information and outputting a delayed phase information to said second averager, wherein
    the second averager of the phase estimator generates subsequent second phase information based on the second decoded data and the delayed phase information received from the second delayer.

3. The apparatus of claim 1, wherein: the converted synchronization signals are at least one of locked position signals and locked energy signals.

4. The apparatus of claim 2, further comprising:
    a first and second groups of multipliers that multiplies the received data and a code; and
    a first and a second adders that adds data outputted from the first and second groups of multipliers, respectively, wherein
    the first averager averages data outputted from the first adder with the first output signal;
    the second averager averages data outputted from the second adder with the first output signal.

5. The apparatus of claim 1, wherein the CPU provides the first output signal to initialize the first and second averagers.

6. A method for estimating phase information, comprising:
    estimating synchronization data, based on received data;
    generating a Cos A signal and a Sin A signal to a converted phase value of the received data in a pilot signal;
    generating first and second decoded data based on the received data and a code, the code corresponding to a synchronization time of the synchronization data;
    outputting first and second average values of phase information obtained by averaging the synchronization data and the first and second decoded data and using at least the converted phase value.

7. The method of claim 6, wherein the average values are initialized using the synchronization data.

8. The method of claim 6, wherein subsequent first and second phase information is obtained by averaging the phase information with subsequent first and second decoded data.

9. A method of estimating phase information, comprising:
    generating a synchronization signal and a converted phase value of a pilot signal with a matched filter based on received data;
    establishing an averaging period based on the synchronization signal and the converted phase value; and
    averaging the synchronization signal with first and second decoded data obtained during the averaging period using at least the converted phase value to create a first and second phase information for a first and second averaging periods, wherein the converted phase value comprises a cosine A signal and a sine A signal.

10. The method of claim 9, further comprising multiplying the received data, received during the averaging period, by a pseudo-noise (PN) code to form the first and second decoded data.

11. The method of claim 10, further comprising synchronizing the PN code with the first and second averaging periods.

12. The method of claim 9, wherein:
the synchronization signal is generated based on a synchronization preamble within the received data;
the converted phase value is generated based on a phase preamble within the received data; and
the converted phase value identifies a phase shift in the received data.

13. The method of claim 9, wherein:
the converted phase value identifies a phase shift in a transition between symbols of the received data; and
the symbols are represented by multiple phases.

14. The method of claim 9, wherein said averaging averages the first decoded data using the first phase information and averages the second decoded data using the second phase information, respectively, received during a current averaging period, with the phase information of a previous averaging period to create first and second phase information for the current averaging period.

15. A receiver for a communication system, comprising:
a filter means for generating a synchronization signal and a converted phase value of a pilot signal based on received data;
a processor means for establishing an averaging period based on the synchronization signal and the converted phase value; and
an averaging means for averaging the synchronization signal with first and second decoded data obtained during the averaging period to create first and second phase information for the averaging period and using at least the converted phase value, wherein the converted phase value comprises a cosine A signal and a sine A signal.

16. The receiver of claim 15, further comprising
a correlator means that multiplies the received data, received during the averaging period, by a pseudo-noise (PN) code to form the first and second decoded data.

17. The receiver of claim 16, wherein the processor means synchronizes the PN code with the averaging period.

18. The receiver of claim 15, wherein:
the synchronization signal is generated based on a synchronization preamble within the received data;
the converted phase value is generated based on a phase preamble within the received data; and
the converted phase value identifies a phase shift in the received data.

19. The receiver of claim 15, wherein:
the converted phase value identifies a phase shift in a transition between symbols of the received data; and
the symbols are represented by multiple phases.

20. The receiver of claim 15, further comprising a delay means, operating in conjunction the averaging means, for averaging the first and second decoded data, received during a current averaging period, using a delayed first and second phase information of a previous averaging period to create the first and second phase information for the current averaging period.

* * * * *